(12) United States Patent
Long et al.

(10) Patent No.: US 7,343,691 B2
(45) Date of Patent: Mar. 18, 2008

(54) GIRTH MEASUREMENT DEVICE

(75) Inventors: Nick R. Long, Portland, OR (US);
Jeffrey L. Crull, McFarland, WI (US);
Michael J. Maloney, Madison, WI (US);
Tom Sutrina, Rockford, IL (US);
Thomas P. Blandino, Cottage Grove, WI (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 11/383,530

(22) Filed: May 16, 2006

(65) Prior Publication Data

US 2007/0266581 A1    Nov. 22, 2007

(51) Int. Cl.
*A61B 5/103* (2006.01)
*A61B 5/117* (2006.01)

(52) U.S. Cl. ............... 33/555.4; 33/515; 33/3 R

(58) Field of Classification Search ............ 33/555.4, 33/511–512, 515, 3 R, 3 A, 3 B, 3 C, 542
See application file for complete search history.

(56) References Cited

U.S. PATENT DOCUMENTS 3,098,301 A * 7/1963 Simpson .................. 33/3 B
6,192,593 B1 * 2/2001 Borchers et al. .......... 33/3 A

* cited by examiner

*Primary Examiner*—Yaritza Guadalupe-McCall
(74) *Attorney, Agent, or Firm*—Plumsea Law Group, LLC

(57) ABSTRACT

A girth measuring device for a shoe is disclosed. The portions of the device are configured to be placed inside the shoe and a measurement ribbon is moved from a retracted position to an expanded position. As the measurement ribbon expands, it eventually contacts the shoe. This contact can be sensed and information related to the girth of the shoe is available.

22 Claims, 8 Drawing Sheets

GIRTH MEASUREMENT DEVICE

BACKGROUND OF THE INVENTION

1. Field of the Invention

The present invention relates generally to shoe sizing, and in particular to a device for quantifying the interior girth of a shoe.

2. Description of Related Art

Shoe design is an iterative process that often involves many changes in materials, patterns, and even the overall design. At each stage in the process, shoe samples are produced and evaluated visually for proper fit. If time permits, a shoe sample may also be evaluated for proper fit by fit testing. At any stage in the development process, changes to the shoe design may result in changes to the fit of the shoe, some of which may be intentional and some not.

Additionally, once a shoe enters production, production errors may result in the production of shoes of irregular sizes. Production errors can also result in irregularities in the dimensions of a shoe, including the internal length, width, and girth of the shoe. A device is needed that can quickly and accurately measure a shoe and provide sizing information.

SUMMARY OF THE INVENTION

In one aspect, the invention provides a measuring device for a shoe comprising a measuring module configured to be disposed inside the shoe; the measuring module including a measurement ribbon having a retracted position and a measuring position; and wherein the retracted position is at a first radial position and the measuring position is at a second radial position that is different than the first radial position.

In another aspect, the measurement ribbon is moved from the retracted position to the measuring position by a rotary motor.

In another aspect, the rotary motor is a motor that can provide angular position information.

In another aspect, the angular position information is used to determine a girth measurement for the shoe.

In another aspect, the measurement ribbon is wound around an output shaft of a rotary motor.

In another aspect, rotation of the output shaft causes the measurement ribbon to unwind and a portion of the measurement ribbon to pass through a stationary slot.

In another aspect, one end of the measurement ribbon is received in a slot associated with the output shaft of the rotary motor.

In another aspect, the invention provides a measuring device for a shoe comprising: a measurement module configured to be placed inside a shoe; the measurement module including a housing; a measurement ribbon having a first position where a first portion of the measurement ribbon is disposed inside the housing and a second portion of the measurement ribbon being disposed outside of the housing; and where the length of the second portion of the measurement ribbon can be varied.

In another aspect, a first end of the measurement ribbon is attached to the housing.

In another aspect, the length of the second portion is varied by the rotation of an actuator.

In another aspect, the actuator is rotated by an electric motor.

In another aspect, the length of the second portion of the measurement ribbon is increased until the second portion contacts the shoe.

In another aspect, the measuring device determines contact with the shoe by sensing a resistance of an electric motor configured to move the measurement ribbon.

In another aspect, a girth measurement of the shoe can be determined by retrieving information associated with the electric motor.

In another aspect, angular position information is retrieved from the electric motor.

In another aspect, the invention provides a method for measuring the girth of a shoe comprising the steps of: placing a measuring module generally inside the shoe; moving a measurement ribbon associated with the measuring module from a retracted position to an expanded position; sensing contact of the measurement ribbon with the shoe; and retrieving information related to the girth of the shoe.

In another aspect, the measurement ribbon is moved by an electric motor.

In another aspect, the step of sensing contact comprises the step of sensing a resistance of the electric motor.

In another aspect, the step of retrieving information includes the step of retrieving angular position information related to the electric motor.

In another aspect, the measurement ribbon is moved by an instruction provided by a computer.

In another aspect, a computer retrieves information related to the girth of the shoe from an electric motor associated with the measurement ribbon.

In another aspect, the computer determines the girth of the shoe using the information retrieved from the electric motor.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
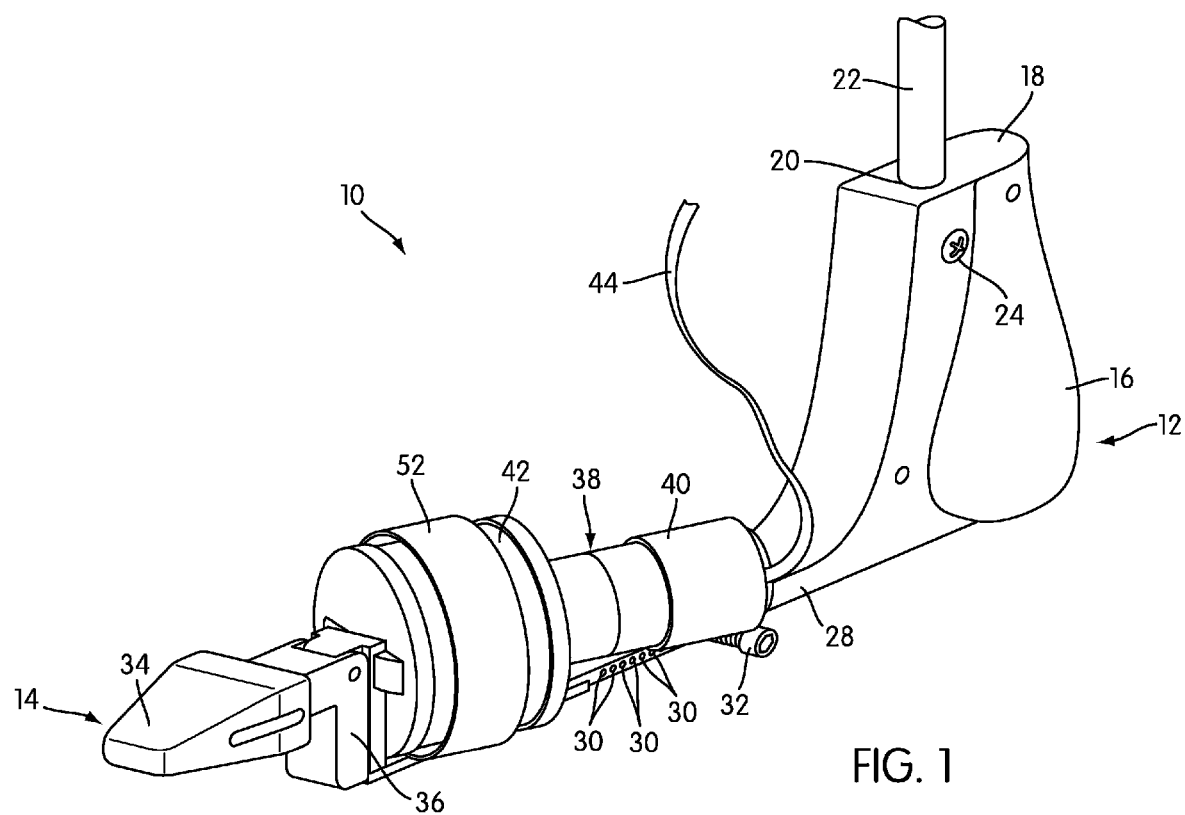
FIG. 1 is a perspective view of a girth measurement device according to one embodiment of the invention.

FIG. 1 is a perspective view of a girth measurement device, generally indicated at 10, according to one embodiment of the invention. Girth measurement device 10 includes a first portion 12 and a second portion 14.

First portion 12 is preferably adapted to simulate some aspects of the shape and size of the proximal portion of the human foot. In particular, first portion 12 includes a heel contact portion 16. The shape, size, and curvature of heel contact portion 16 are preferably shaped to approximate the shape, size, and curvature of the human heel, although the degree of fidelity with which they do so may vary from embodiment to embodiment. However, unlike a human heel, heel contact portion 16 is preferably generally symmetric, so as to fit both right- and left-handed shoes. Although shown in FIG. 1 as having a generally curved shape, in other embodiments, heel contact portion 16 need not be curved or have any particular shape, as long as it is capable of being seated securely in the heel portion of a right or left shoe.

Figure 2:
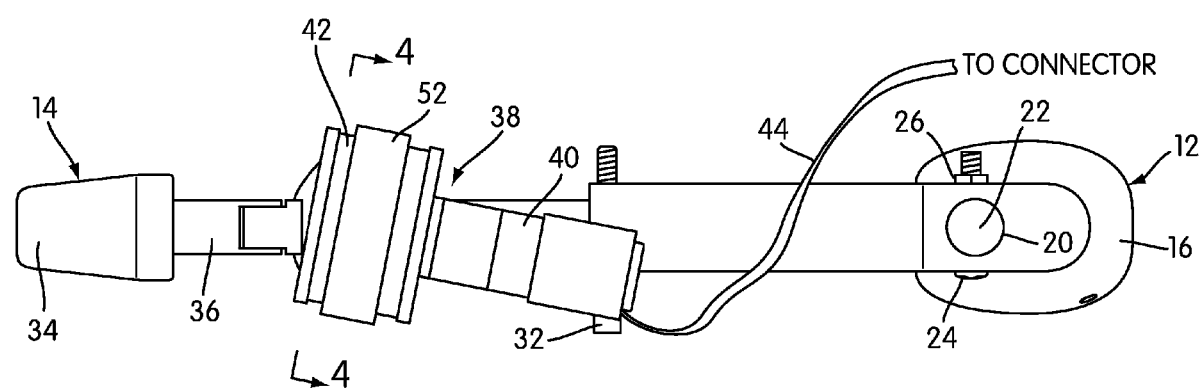
FIG. 2 is a top plan view of the girth measurement device of FIG. 1.
Figure 3:
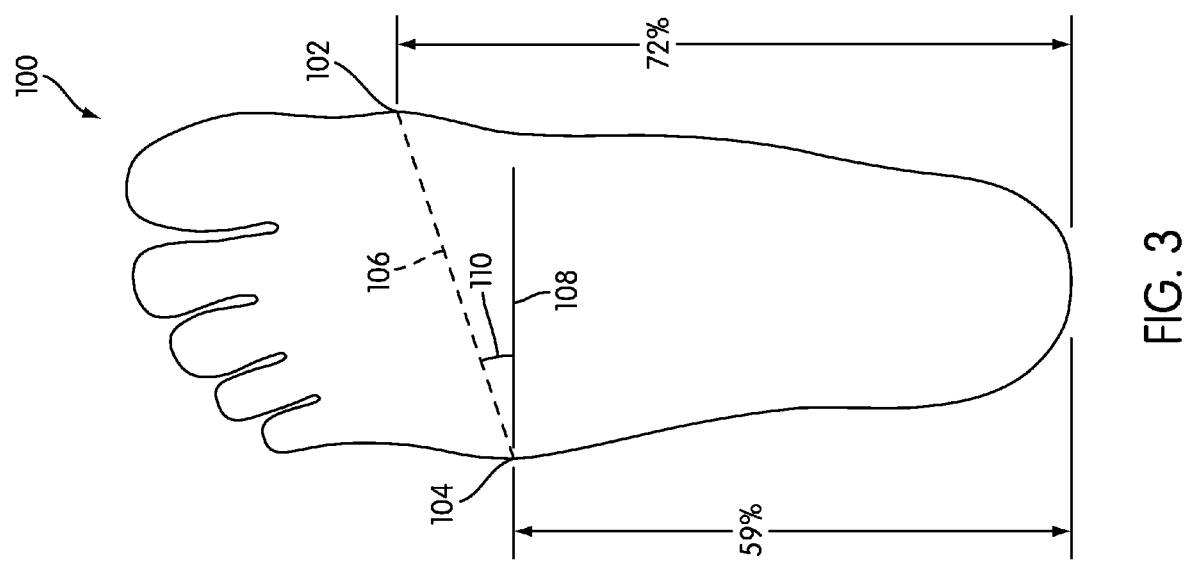
FIG. 3 is a schematic diagram of a human foot.

First portion 12 is generally L-shaped and, preferably, is formed of a material such as plastic or metal. An upper surface 18 of first portion 12 provides an opening 20 that extends into the interior of first portion 12 and receives a rod 22, thus allowing girth measurement device 10 to be mounted in a testing station, as will be described below in more detail. A rod fastener 24, which is a machine screw in the illustrated embodiment, is inserted through the side of first portion 12 in order to secure rod 22 within opening 20. As shown in FIG. 2, a top plan view of girth measurement device 10, rod fastener 24 passes through first portion 12 and is secured by a nut 26 on the opposite side.

Figure 4:
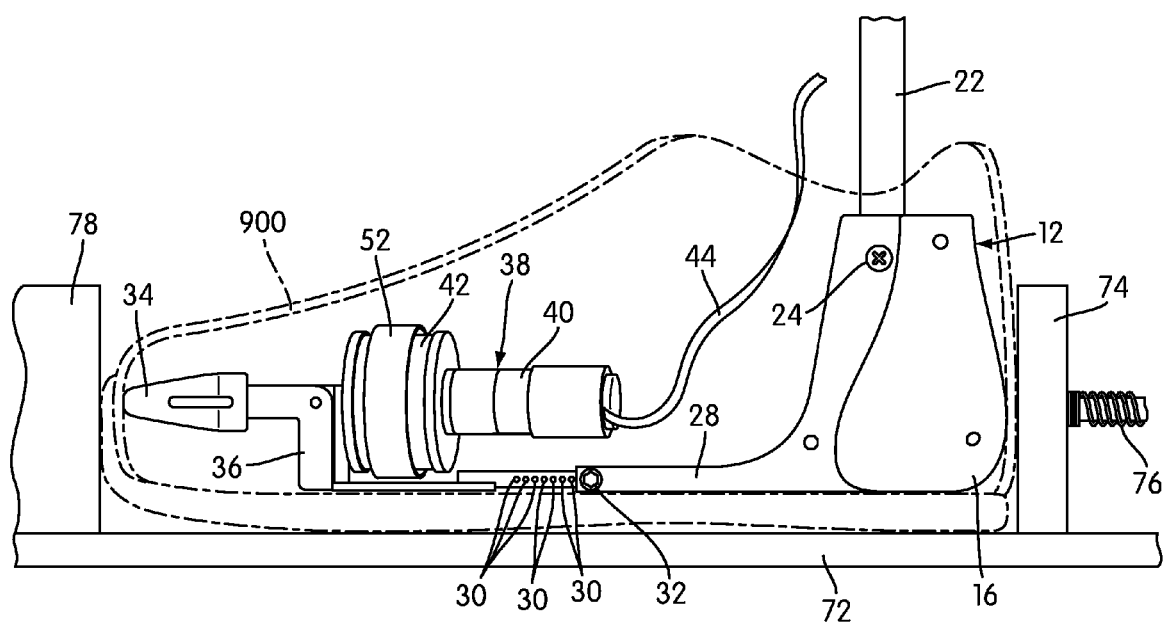
FIG. 4 is a side elevational view of the girth measurement device of FIG. 1, shown within a shoe.

FIG. 4 is a side elevational view of girth measurement device 10 in position within a shoe, indicated in phantom in FIG. 4 at 900. Certain shoe-positioning features illustrated in FIG. 4 will be described below in more detail with respect to FIGS. 7 and 8. As shown in FIGS. 1, 2 and 4, the lower portion 28 of the generally L-shaped first portion 12 is adapted to rest against the interior bottom or insole of shoe 900. First portion 12 terminates at a point located at about half the length of shoe 900. At its farthest distal extent, first portion 12 connects with second portion 14.

In some embodiments of the invention, a girth measurement device may be made using essentially one contiguous, integral bracket to define its overall shape and extent, such that the first and second portions 12, 14 would be integral portions of the device, rather than separate parts. However, it may be preferable to make girth measurement device 10 with separate first and second portions 12, 14.

Shoes may differ in overall length from one model to the next, and girth measurement device 10, being made of separate first and second portions 12, 14, provides a mechanism for adjusting to the lengths of different shoes 900. In the illustrated embodiment, at the distal end of first portion 12, first portion 12 has a generally rectangular cross-section, and is hollow so as to form a channel. At that point, second portion 14 is shaped and sized to be received within first portion 12 and to slide within first portion 12 so as to vary the overall length of girth measurement device 10. Along its lateral edge, second portion 14 includes a number of length adjustment holes 30, each of which defines a particular overall length of girth measurement device 10. First and second portions 12, 14 are secured together by a releasable length adjustment fastener 32 that inserts into a corresponding hole (not shown) in the side of first portion 12 and passes through one of a set of length adjustment holes 30 in second portion 14, one on each side of second portion 14.

At its distal end, second portion 14 includes an end piece 34 that is sized and adapted to fit against the toe portion of shoe 900. End piece 34 of the preferred embodiment is generally trapezoidal in overall shape, as shown in the top plan view of FIG. 1, and is mounted on a bracket 36 of the second portion 14 that raises end piece 34 off the bottom of shoe 900 so that end piece 34 is in contact with the middle height of the toe portion of shoe 900. In the illustrated embodiment, bracket 36 is also pivoted about a horizontal axis of rotation such that it can swing upwardly if necessary. In other embodiments, end piece 34 may have any shape and any vertical position, so long as it allows girth measurement device 10 to fit snugly within shoe 900.

Girth, as the term is used here, refers to the entire circumference along the interior wall of a shoe. Preferably, girth measurement device 10 includes a girth measurement module 38 mounted at some point along the first and second portions 12, 14 of girth measurement device 10. Girth measurement module 38 may be positioned at any point along the first and second portions 12, 14 that will allow a consistent and reproducible girth measurement to be taken among a plurality of shoes. In preferred embodiments of the invention, the girth measurement actuator may be placed in a position along first and second portions 12, 14 of girth measurement device 10 that coincides with anatomical landmarks of the human foot.

In the embodiment shown in the figures, girth measurement module 38 is preferably mounted on second portion 14 in a position to take an angled girth measurement along the entire circumference of the inside wall of shoe 900. As shown in the top plan view of FIG. 2, girth measurement module 38 is preferably angled from a longitudinal axis extending from heel contact portion 16 to end piece 34. The angle is preferably determined using certain preselected anatomical landmarks disclosed below.

In an exemplary embodiment, shown in FIG. 4, girth measurement module 38 is positioned to take a girth measurement along a line 106 that extends at an angle across foot 100 in a position that roughly corresponds with the position of the tarsometatarsal joint in the foot, from the tuberosity of the first metatarsal bone 102 on the medial aspect of the foot to the tuberosity of the fifth metatarsal bone 104 on the lateral aspect of the foot. Comparing line 106 with a horizontal line 108, experiments for certain sizes of the human foot reveal an angle of about 11 degrees. Of course angle 110 may vary with different sizes and between male and female feet. It is also possible to relate these anatomical landmarks with the overall length of foot 100. In one example, where foot 100 is a size 9 male foot, anthropometric measurements have shown that girth measurement module 38 is positioned to take a measurement along a line between a lateral position 104 that is about 59% of the length of the foot to a medial position 102 that is about 72% of the length of the foot. These relative lengths will vary depending on the size of the foot and the gender of the foot.

Girth measurement module 38 comprises a motor 40 and a housing 42. Motor 40 is preferably a rotary motor, such as an electric motor. In preferred embodiments, motor 40 may be a specialized electric motor that can report its angular position, such as a stepper motor. Preferably, motor 40 is adapted to communicate with and be connected to a measurement system. To that end, motor 40 includes a cable 44, through which it draws power and communicates with a measurement system, indicated generally at 200 in FIG. 7. The cable 44 may terminate in a connector for easy connection to a measurement system. For example, in one preferred embodiment, the connector may be a DB9 male connector and motor 40 may use the RS-232/EIA-232 serial communication protocols to communicate with the measurement system (*EIA232F—Interface Between Data Terminal Equipment and Data Circuit-Terminating Equipment Employing Serial Binary Data Interchange*, Electronic Industries Association, Washington, D.C., United States, 1997). Other details of the use of girth measurement module 38 with a measurement system will be described below in more detail.

Figure 5:
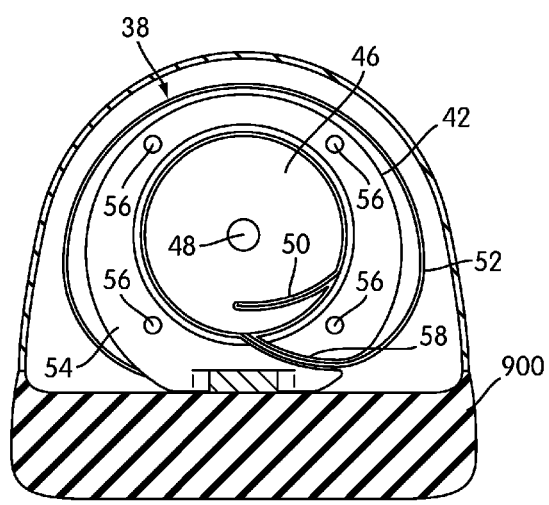
FIG. 5 is a partial front elevational view illustrating the girth measurement device of FIG. 1 in a retracted position.
Figure 6:
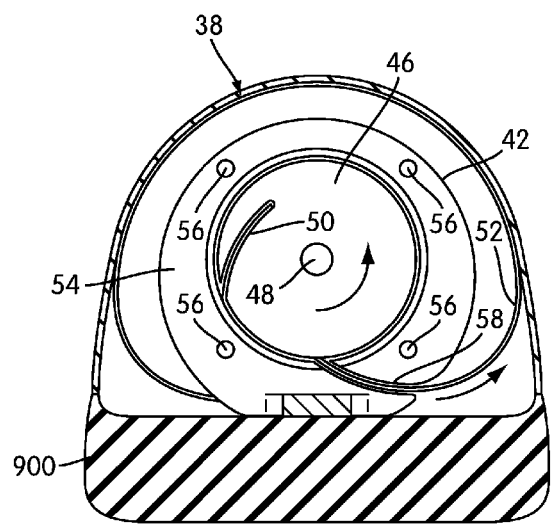
FIG. 6 is a partial front elevational view illustrating the girth measurement device of FIG. 1 in a measuring position.

Housing 42 and its interior components are best seen in FIGS. 5 and 6, which are partial front elevational views of the girth measurement device 38 installed in a shoe in retracted and measuring positions, respectively. At the center of housing 42 is a generally cylindrical actuator 46. Actuator 46 is mounted on a shaft 48 connected to and driven by motor 40, such that when motor 40 is caused to move shaft 48, actuator 46 is caused to rotate.

Actuator 46 includes a first slot 50 that, in the illustrated embodiment, is slightly arcuate and extends from the edge of actuator 46 toward its interior. One end of a measurement ribbon 52 is received and secured within first slot 50. The securement of measurement ribbon 52 within first slot 50 may be by fastener, adhesive, interference fit, or some other suitable means. Measurement ribbon 52 extends out of slot 50 and is wound around actuator 46.

Surrounding actuator 46 is a fixed portion 54 that, in the illustrated embodiment, is secured by a set of four fasteners 56 to a non-moving portion of housing 42. Fixed portion 54 includes a fixed-position second slot 58 that extends from its interior proximate to actuator 46 to its exterior and is sized and contoured to create a passage for measurement ribbon 52 to pass through to the exterior of housing 42.

Measurement ribbon 52 extends from first slot 50 in actuator 46, is wound around actuator 46, transits and emerges from second slot 58, and extends over the arcuate top exterior surface of housing 42. The end of measurement ribbon 52 is secured to fixed portion 54 on a lower exterior part of fixed portion 54.

Thus, the entire arrangement of measurement ribbon 52 is such that a first portion of measurement ribbon 52 is within housing 42 and is essentially wound around shaft 48, since actuator 46 is fixed to shaft 48. Measurement ribbon 52 passes through the fixed second slot 58 and a second portion of measurement ribbon 52 is thus disposed outside of housing 42. Rotation of shaft 48 causes measurement ribbon 52 to unwind and a portion of measurement ribbon 52 to move through the fixed second slot 58, effectively decreasing the length of the first portion of measurement ribbon 52 inside housing 42 and increasing the length of the second portion of measurement ribbon 52 outside of housing 42. Measurement ribbon 52 is thus positioned to be moved between retracted and measuring positions, the retracted and measuring positions being radially different and offset from one another. Both positions will be described in more detail below.

Preferably, measurement ribbon 52 is made of a strong but flexible material. In the illustrated embodiment, for example, measurement ribbon 52 may be a metal ribbon, such as a steel ribbon, although other metals and plastics may be used. Regardless of the particular material of which measurement ribbon 52 is made, measurement ribbon 52 is preferably of a known length, such that the length of measurement ribbon 52 that is unwound from actuator 46 and caused to extend outside housing 42 can be quantified and directly or indirectly correlated with the amount that actuator 46 is caused to rotate by motor 40.

FIG. 5 illustrates the retracted position of measurement ribbon 52. In this position, a substantial portion of measurement ribbon 52 is wound around actuator 46 and/or positioned within housing 42. When a girth measurement is desired, girth measurement device 10 is seated within shoe 900 and actuator 46 is caused to rotate in a direction that causes measurement ribbon 52 to unwind, forcing measurement ribbon 52 out of second slot 58 and causing it to expand radially outward within shoe 900 until it touches the interior walls of shoe 900. This measurement position of measurement ribbon 52 is illustrated in FIG. 6. In the measurement position, where measurement ribbon 52 has been fully extended and has contacted the inner portion of shoe 900, position information can be retrieved and taken as the girth of shoe 900. This position information can be related to the measurement position of ribbon 52 as shown in FIG. 5. Returning to FIG. 5, a counterclockwise rotation of shaft 48 is shown to cause measurement ribbon 52 to unwind; however, the sense of the motion may be reversed in other embodiments.

Depending on the type of motor 40, there are a number of ways in which the girth measurement provided by measurement ribbon 52 may be sensed and captured electronically. For example, if motor 40 is a conventional electric motor, the girth measurement could be detected by connecting the motor to a timer and an ammeter. When measurement ribbon 52 meets the interior walls of shoe 900, it will generate resistance to movement that will increase the amount of current drawn by the motor as the motor attempts to overcome the resistance. That additional current draw can be detected, and if the length of time that the motor was rotating at a given rotational speed before the additional current draw is recorded, the data can be converted to an arc length/girth measurement by one of skill in the art.

However, in a preferred embodiment, if motor 40 is a stepper motor, the stepper motor may be instructed to advance until a certain level of resistance is experienced, stop, and report its angular position.

The particular method of girth measurement detection using the mechanism illustrated in FIGS. 5 and 6 will vary by embodiment. For example, in other embodiments, particular sensors, such as an angular position sensor on shaft 48, may be used. The particular method of girth measurement detection is not critical so long as it is easy to implement, mechanically robust, and produces accurate, reproducible results.

Figure 7:
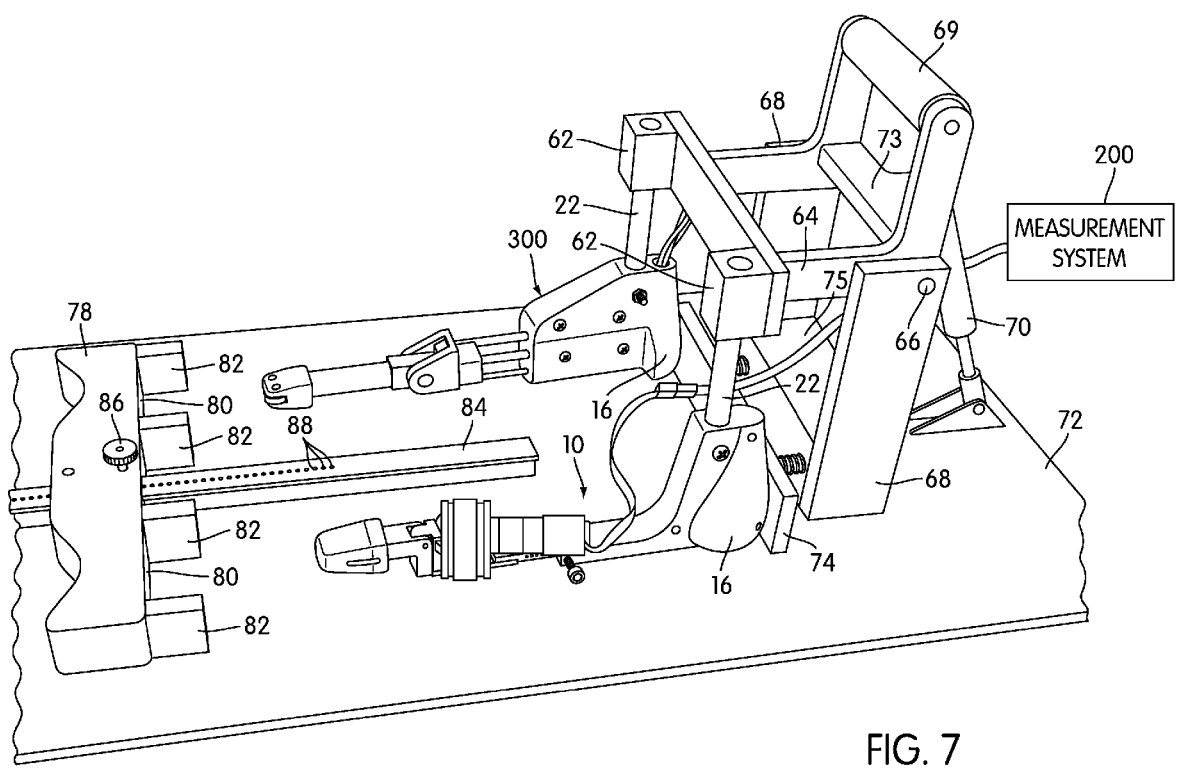
FIG. 7 is a perspective view of the girth measurement device as installed in a testing station.

FIG. 7 is a perspective view illustrating the girth measurement device 10 as installed in a testing station, generally indicated at 60. Although girth measurement device 10 may be installed in a testing station alone, testing station 60 includes a shoe size testing device, generally indicated at 300. Shoe size testing device 300 is described in commonly assigned U.S. Pat. No. 6,192,593, the contents of which are hereby incorporated by reference in their entirety. In general, girth measurement device 10 may be used with any other devices. In preferred embodiments, as in the illustrated embodiment, girth measurement device 10 may be used in integrated testing stations without other measuring and testing devices that complement its functions.

In order to connect girth measurement device 10 to testing station 60, rod 22 extends into and is received slidably in a height adjustment block 62. Height adjustment block 62 secures girth measurement device 10 releasably, for example, by means of a set screw that extends through height adjustment block 62 and contacts rod 22 when tightened, in such a way that the position of rod 22 within height adjustment block 62 may be changed as needed.

Height adjustment block 62 is attached to and forms one end of an L-shaped lever structure 64. Lever structure 64 is mounted on and pivots about a lever pivot 66. Lever pivot 66 comprises a bar mounted between two vertical support members 68. One end of lever structure 64 includes a handle 69 that allows a tester to pivot the lever structure 64. Some embodiments include provisions that help to counterbalance the weight of lever structure 64. Any mass-spring-damper system can be employed to provide a counterbalance. In some embodiments, a spring is used, in other embodiments, a damper is used and in other embodiments, a combination of a spring and damper is used, it is also possible to use a fluid strut or cylinder. In one embodiment, a gas cylinder 70 is pivotally attached to a base 72 on one end, and is attached to lever portion 64 at its other end by way of an attachment plate 73, thus providing support, counterbalancing some of the weight of lever structure 64 with attached girth measurement device 10, and providing for a smoother movement when lever structure 64 is pivoted. While gas cylinder 70 is shown in the illustrated embodiment, it should be kept in mind that other systems or provisions could also be used, including systems that include springs.

Also included in testing station 60 are two features that ensure that a shoe is placed in an appropriate position during girth measurement. Specifically, a heel plate 74 is mounted by way of a spring 76 to a fixed-position support 75 located between the two vertical support members 68. Heel plate 74 is thus positioned to support and brace a shoe snugly between it and heel contact portion 16. When shoe 900 is placed between heel plate 74 and heel contact portion 16, the toe of shoe 900 can move transversely and pivot to a limited extent. This limited movement generally does not affect the performance or accuracy of the girth measurement. This is because, regardless of the transverse position or pivot angle of shoe 900, the girth measurement will occur at a consistent axial position along the longitudinal axis of shoe 900.

Toe stop 78 includes a transverse wall 80 that is arranged to prevent shoe 900 from moving excessively in a forward-rearward direction and pairs of side stops 82 arranged to prevent shoe 900 from moving excessively side to side. Toe stop 78 engages and slides along a rail 84 and can be releasably locked using a thumbscrew 86 into any one of a number of positions defined by a series of positioning holes 88 sized and adapted to engage the thumbscrew 86. In addition to all of those features, base 72 provides a fixed bottom surface against which shoe 900 bears during testing.

Figure 8:
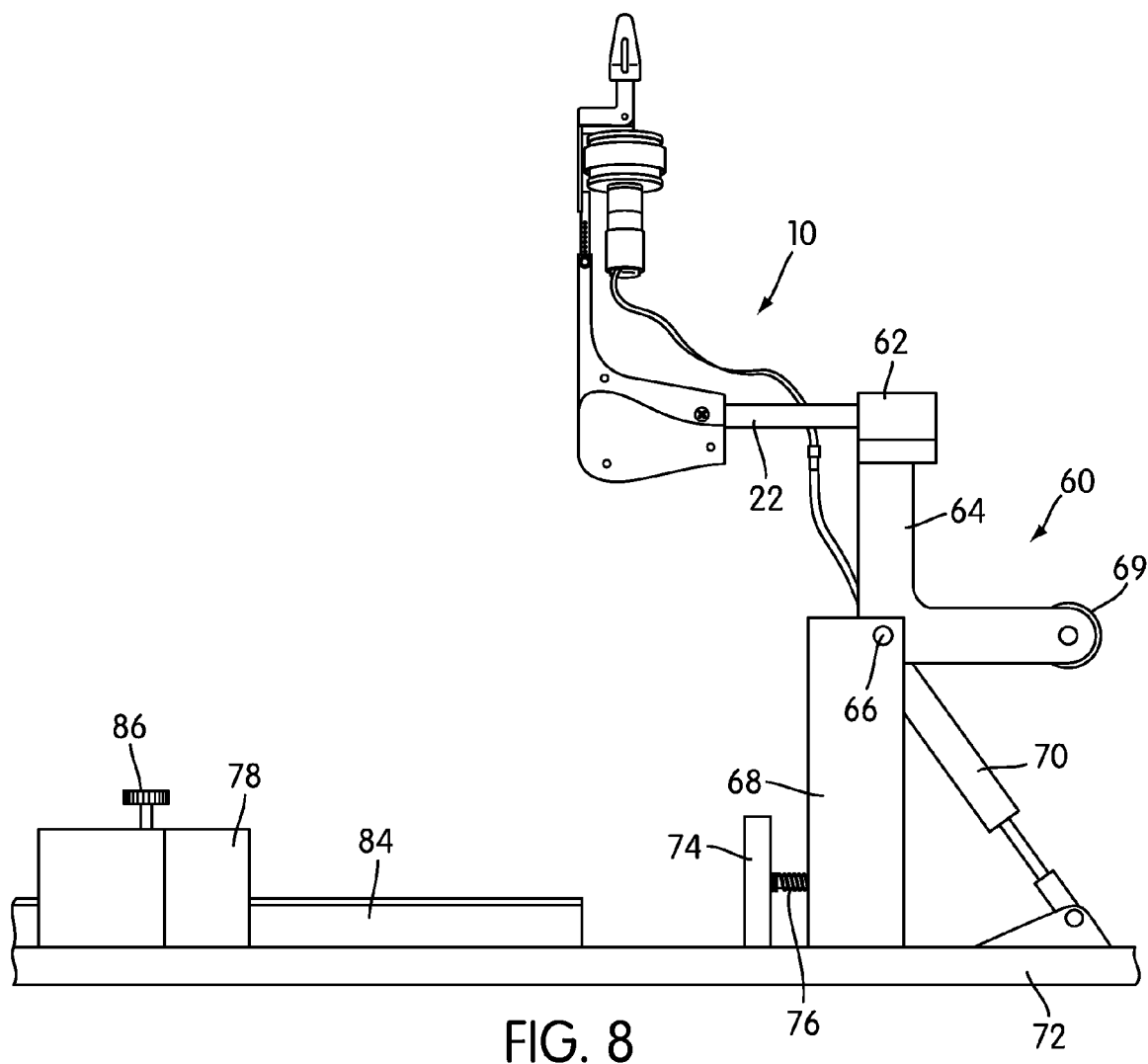
FIG. 8 is a side elevational perspective view of the testing station of FIG. 7, illustrating the girth measurement device in an elevated position.

When a user wishes to place shoe 900 onto girth measurement device 10 for testing, handle 69 is pulled in order to pivot girth measurement device 10 into the elevated view illustrated in the side elevational view of FIG. 8. Shoe 900 is then placed on first and second portions 12, 14 of girth measurement device 10 much as shoe 900 would be placed on a human foot. A placement tool, such as a shoehorn, may be used if necessary to increase the ease of shoe 900 placement.

Once shoe 900 is placed on girth measurement device 10, handle 69 is used to pivot girth measurement device 10 down, such that it is once again proximate to base 72. At that point, the heel of shoe is pinched between heel plate 74 and heel contact portion 16. The toe of shoe 900 can pivot and move slightly in a transverse direction (this is, side to side). If necessary, toe stop 78 can be adjusted so that the movement of the toe of shoe 900 is limited. In some cases, the toe of shoe 900 is placed in contact with toe stop 78. However, these toe adjustments are merely optional and not essential.

If additional vertical clearance is needed so that the sole of shoe 900 can rest properly on base 72, the position of rod 22 within height adjustment block 62 can be adjusted appropriately. After the initial adjustments are complete, shoe 900 is fixed in position between heel plate 74 and heel contact portion 16, and the heel of shoe 900 cannot move once girth measurement begins.

When shoe 900 is properly fixed in position for testing, testing can be initiated by starting motor 46 to move measurement ribbon 52 from the retracted to an expanded measuring position, sensing contact with shoe 900, and then detecting and recording the girth measurement that is produced. Although a measurement based on a single expansion to the measuring position can be used in some embodiments, a preconditioning step is preferred. In the pre-conditioning step, measurement ribbon 52 is expanded and retracted a number of times to provide an initial stretch to the materials of the shoe. Pre-conditioning of the shoe has also been found to better simulate the actual performance and response of the shoe when worn. After the pre-conditioning step, a number of girth measurements can be taken, and those multiple girth measurements can then be averaged to arrive at a final girth measurement for the shoe. In one embodiment, measurement ribbon 52 is expanded and retracted about 30 times inside the shoe. The first 20 or so expansions and retractions are used to pre-condition the shoe and the final 10 or so expansions and retractions are averaged to arrive at a final girth measurement. Of course, any number of pre-conditioning expansion and retraction cycles can be used, and any desired number of measuring expansion and retractions can be gathered and averaged. After testing, shoe 900 can be released from girth measurement device 10 much as it was placed on girth measurement device 10.

In the description above, several methods of detecting the girth measurement generated by girth measuring device 10 were described and any one of those methods may be used. More generally, the girth measurement may be read manually or using analog or digital electronics. However, in preferred embodiments, measurement system 200 is a computing system in communication with girth measurement device 10 through cable 44.

The term computing system is a general one, and may include any electronic system capable of performing the described functions, including general purpose computing systems, such as personal computers, and more specialized computing systems. Moreover, although in a preferred embodiment, girth measurement device 10 may be connected directly with measurement system 200 by means of cable 44, in other embodiments, cable 44 may be connected to additional signal conditioning and data acquisition hardware which is, in turn, connected to measurement system 200 itself.

With an arrangement such as that described above, measurement system 200 preferably includes a program that gathers and records girth measurements from girth measuring device 10. In one particular preferred embodiment, girth measurement device 10 is software-controlled, in that it is able to accept commands to begin gathering girth measurements from measurement system 200, activate motor 46 as necessary, sense contact of measurement ribbon 52 with shoe 900, gather the measurement or measurements, and report them back to measurement system 200.

Figure 9:
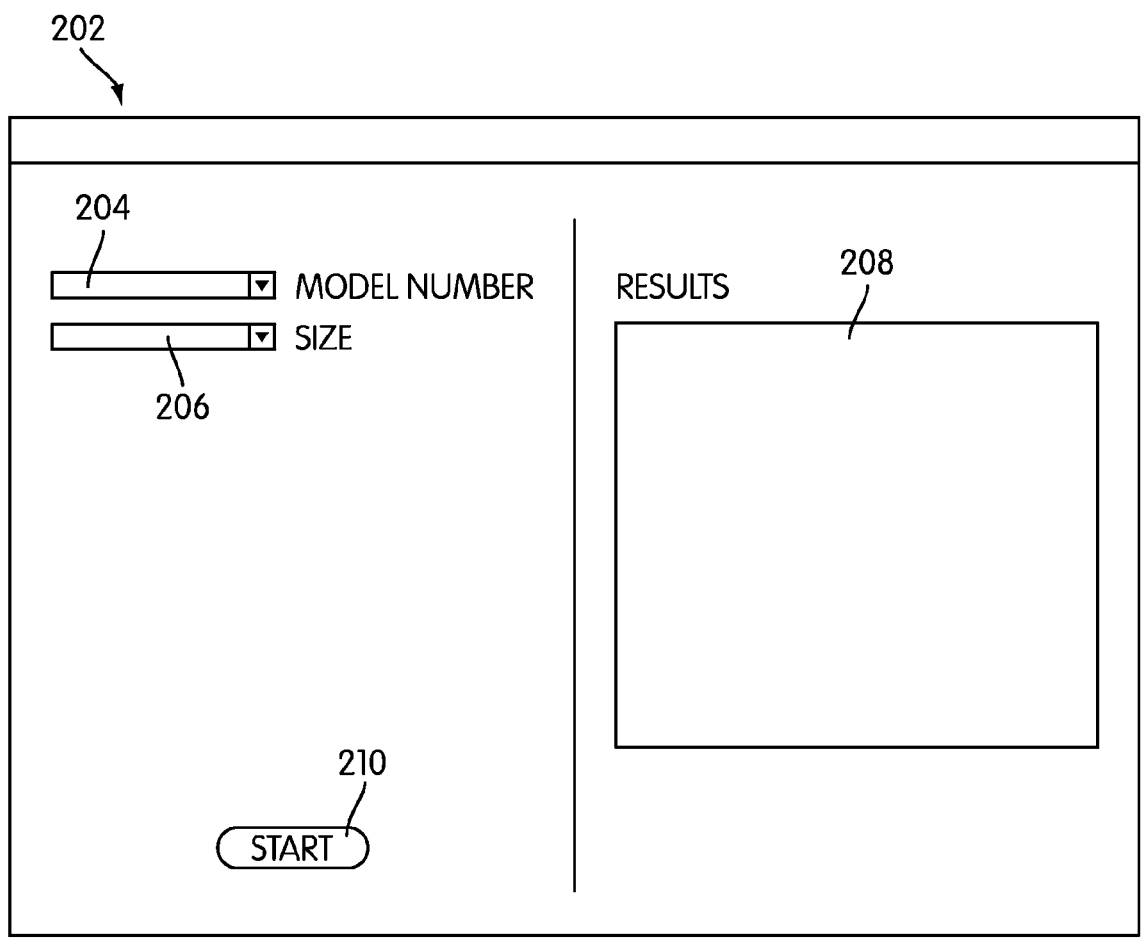
FIG. 9 is a schematic illustration of a software program for controlling the girth measurement device.

Any interface or control system can be used to operate girth measuring device 10. In some embodiments, a computer is used to control and operate girth measuring device 10. FIG. 9 is a schematic illustration of an example user interface, generally indicated at 202, of a software program that may be used with measurement system 200 and girth measuring device 10. Preferably, user interface 202 is easy to use. In the illustrated embodiment, user interface 202 includes a model number selection box 204 for the model number of shoe 900, a size selection box 206 for the size of shoe 900, and a results window 208, in which the measurements or results of the test are displayed. With interface 202, a user would select the model number and size of shoe 900 using the appropriate selection boxes 204, 206 and then toggle start button 210 to begin taking measurements from shoe 900, which has presumably been placed on girth measurement device 10. Results would be displayed in results window 208. If the testing station has multiple testing devices, like testing station 60, results from all devices may be displayed in results window 208. The exemplary user interface shown in FIG. 8 is an example. Other software applications and/or user interfaces can also be used to control and operate girth measuring device 10.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A measuring device for a shoe comprising:
   a measuring module configured to be disposed inside the shoe;
   the measuring module including a measurement ribbon having a retracted position and a measuring position; and
   wherein the retracted position is at a first radial position and the measuring position is at a second radial position that is different than the first radial position.

2. The measuring device according to claim 1, wherein the measurement ribbon is moved from the retracted position to the measuring position by a rotary motor.

3. The measuring device according to claim 2, wherein the rotary motor is a motor that can provide angular position information.

4. The measuring device according to claim 3, wherein the angular position information is used to determine a girth measurement for the shoe.

5. The measuring device according to claim 1, wherein the measurement ribbon is wound around an output shaft of a rotary motor.

6. The measuring device according to claim 5, wherein rotation of the output shaft causes the measurement ribbon to unwind and a portion of the measurement ribbon to pass through a stationary slot.

7. The measuring device according to claim 5, wherein one end of the measurement ribbon is received in a slot associated with the output shaft of the rotary motor.

8. A measuring device for a shoe comprising:
   a measurement module configured to be placed inside a shoe;
   the measurement module including a housing;
   a measurement ribbon having a first position where a first portion of the measurement ribbon is disposed inside the housing and a second portion of the measurement ribbon being disposed outside of the housing; and
   wherein the length of the second portion of the measurement ribbon can be varied.

9. The measuring device according to claim 8, wherein a first end of the measurement ribbon is attached to the housing.

10. The measuring device according to claim 8, wherein the length of the second portion is varied by the rotation of an actuator.

11. The measuring device according to claim 10, wherein the actuator is rotated by an electric motor.

12. The measuring device according to claim 8, wherein the length of the second portion of the measurement ribbon is increased until the second portion contacts the shoe.

13. The measuring device according to claim 12, wherein the measuring device determines contact with the shoe by sensing a resistance of an electric motor configured to move the measurement ribbon.

14. The measuring device according to claim 13, wherein a girth measurement of the shoe can be determined by retrieving information associated with the electric motor.

15. The measuring device according to claim 14, wherein angular position information is retrieved from the electric motor.

16. A method for measuring the girth of a shoe comprising the steps of:
   placing a measuring module generally inside the shoe;
   moving a measurement ribbon associated with the measuring module from a retracted position to an expanded position;
   sensing contact of the measurement ribbon with the shoe; and
   retrieving information related to the girth of the shoe.

17. The method according to claim 16, wherein the measurement ribbon is moved by an electric motor.

18. The method according to claim 17, wherein the step of sensing contact comprises the step of sensing a resistance of the electric motor.

19. The method according to claim 17, wherein the step of retrieving information includes the step of retrieving angular position information related to the electric motor.

20. The method according to claim 16, wherein the measurement ribbon is moved by an instruction provided by a computer.

21. The method according to claim 16, wherein a computer retrieves information related to the girth of the shoe from an electric motor associated with the measurement ribbon.

22. The method according to claim 21, wherein the computer determines the girth of the shoe using the information retrieved from the electric motor.

* * * * *